US006457678B1

(12) United States Patent
Draim

(10) Patent No.: US 6,457,678 B1
(45) Date of Patent: Oct. 1, 2002

(54) CONSTELLATION OF ELLIPTICAL ORBIT SATELLITES WITH LINE OF APSIDES LYING IN OR NEAR THE EQUATORIAL PLANE

(75) Inventor: John E. Draim, Vienna, VA (US)

(73) Assignee: Mobile Communications Holdings, Inc., Washington, DC (US)

( * ) Notice: Subject to any disclaimer, the term of this patent is extended or adjusted under 35 U.S.C. 154(b) by 17 days.

(21) Appl. No.: 09/640,565

(22) Filed: Aug. 16, 2000

Related U.S. Application Data

(60) Provisional application No. 60/149,279, filed on Aug. 16, 1999.

(51) Int. Cl.[7] .................................................. B64G 1/10

(52) U.S. Cl. .................................................. 244/158 R

(58) Field of Search ........................ 244/158 R; 455/427

(56) References Cited

U.S. PATENT DOCUMENTS

| | | | | |
|---|---|---|---|---|
| 5,326,054 A | | 7/1994 | Turner | 244/158 R |
| 5,553,816 A | | 9/1996 | Perrotta | 244/158 R |
| 5,582,367 A | | 12/1996 | Castiel et al. | 244/158 R |
| 5,668,556 A | * | 9/1997 | Rouffet et al. | 342/354 |
| 5,669,585 A | | 9/1997 | Castiel et al. | 244/158 R |
| 5,788,187 A | | 8/1998 | Castiel et al. | 244/155 R |
| 6,122,596 A | * | 9/2000 | Castiel | 701/226 |
| 6,223,019 B1 | * | 4/2001 | Briskman et al. | 455/12.1 |
| 6,267,329 B1 | * | 7/2001 | Chethik | 244/158 R |

* cited by examiner

*Primary Examiner*—Robert P. Swiatek
(74) *Attorney, Agent, or Firm*—Fish & Richardson P.C.

(57) ABSTRACT

An apogee pointed to the sun system which uses an elliptical orbit that is tiled in a way that exploits asymmetry in the Van Allen belts.

7 Claims, 3 Drawing Sheets

120 115 110 100 125 130 122

CONSTELLATION OF ELLIPTICAL ORBIT SATELLITES WITH LINE OF APSIDES LYING IN OR NEAR THE EQUATORIAL PLANE

CROSS-REFERENCE TO RELATED APPLICATIONS

This application claims benefit of U.S. Provisional application No. 60/149,279, filed Aug. 16, 1999.

The present application describes a particular type of orbit, and constellations of multiple satellites in communication with the earth, employing this particular type orbit. More specifically, orbits are described which are capable of providing enhanced communications capacity or performance for a particular latitude band or bands at a particular local time or times of day at any selected geographical location.

BACKGROUND

Sun-synchronous satellite orbits are known. A basic sun-synchronous orbit is described in U. S. Pat. No. 5,582,367, having common inventorship. This sun-synchronous orbit describes an array of satellites in one or more elliptical orbits.

Mobile Communication Holdings, Inc., the assignee of the present application, has pioneered the concept of sun synchronous elliptical orbits. These orbits include certain advantages. Specifically, the sun-synchronous elliptical orbit avoids some of the problems associated with geosynchronous satellites, including their relatively high height requirement, associated time delay high payload, and other certain problems.

Elliptical orbits and elliptical orbit constellations are also known. The Russian Molniya series of orbits are in this category. They are primarily intended to provide augmented coverage to the Northern Hemisphere, and are constrained to an orbital inclination of approximately 63.4 degrees to maintain their apogees in the Northern Hemisphere. These orbits are not sun-synchronous and generally have an argument of perigee at or very close to −90 degrees.

In order to obtain sun-synchronicity while maintaining the apogee at a fixed latitude, satellites are constrained to lie in orbital planes very close to 116.6 degrees. To date, these orbits have had arguments of perigee at or close to −90 degrees, similar to the Molniya orbits, such that their apogees occur at latitudes in the vicinity of 63.4 degrees North. They provide excellent Northern Hemisphere earth coverage down to about 25 degrees North latitude.

Sun synchronous orbits of this type, however, may have effects based on their interaction with the Van Allen radiation belt.

SUMMARY OF THE INVENTION

The present invention teaches a sun-synchronous satellite orbit having a line of apsides lying in or near (i.e., within 0–60 degrees, more preferably within 0–15 degrees) of the equatorial plane. These elliptical orbits have apogees and perigees near the Equator, e.g., between 0 and 15 degrees inclination, more preferably 0–10 degrees inclination relative to the Equator. These orbits are based on the inventor's recognition that locating the orbits in this way can avoid certain effects from the radiation belt.

Other aspects are described with reference to the claims and the specification that follows.

BRIEF DESCRIPTION OF THE DRAWINGS

These and other aspects will now be described in detail with respect to the accompanying drawings, wherein.

DETAILED DESCRIPTION

Figure 1:
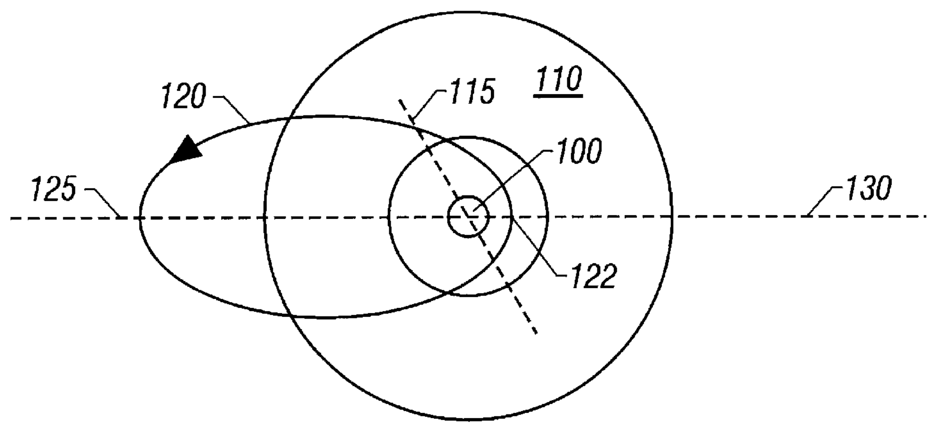
FIG. 1 shows a diagram of a preferred orbit.

FIG. 1 shows a diagram of the Earth's surrounding radiation belts 110 often called the Van Allen radiation belts. The belts may be more concentrated at certain points in the earth's orbit.

While the figures are not shown to scale, it should be seen that an elliptical orbit on the position of the dotted line 115 could have portions which pass right through the radiation belt. According to this embodiment, the orbit is elliptical, with the earth at one focus of the ellipse.

According to the present system, the radiation belt is defined as an undesired area. The new array of elliptical orbits operates in a way that may avoid certain effects from the radiation belt as shown by the new orbit 120. The orbit 120 has an apogee 122 and a perigee 125, both of which are near the Equator of the Earth shown as 130. This system has high elevation angles, but also avoids many of the effects of the radiation belt, by effectively defining the radiation belt as an area which should not be covered.

Figure 2:
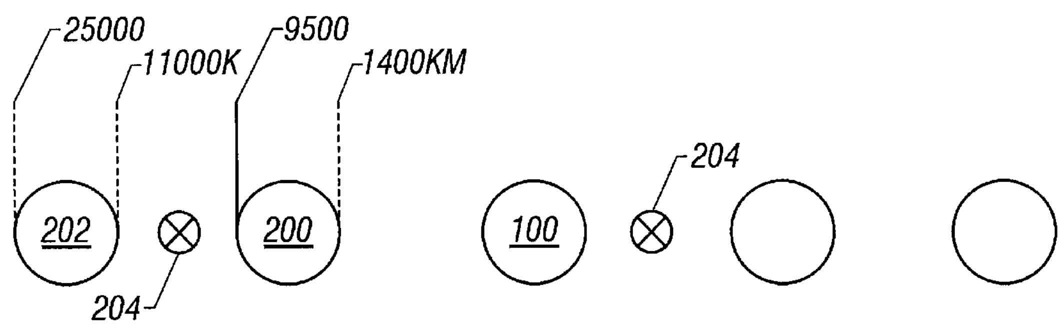
FIG. 2 shows a cross section of that orbit and the belts.

A side view of the radiation belt and the orbit are shown in FIG. 2 which effectively shows a cross-section of the radiation belt. A roughly circular, but asymmetrical band of radiation 200 extends from about 1400 km to about 9500 km. A second band of radiation 202 extends from around 11,000 km to around 25,000 km. According to the present system, the satellite orbit is tilted and arranged to orbit between the main radiation portions.

Portions 204 show a cross-section of this satellite orbit which avoids, as much as possible, these radiation belts.

The orbit is elliptical and sun-synchronous in approximately a 3-hour orbit. Both the apogee and perigee are in or near (within 15 degrees of) the equatorial plane. While the apogee and perigee are in or near the equatorial plane, it should be understood that between 0 and 15 degrees is most preferred. Hence, the argument of perigee of this orbit is equal to or close to 0 or 180 degrees. One advantage is that this can experience less radiation than may be seen by other similar orbits. The baseline "Borealis" orbit described in U.S. Pat. No. 5,582,367 described above is modified to include an absolute omega less than 75–80 ($|\Omega|<80$).

This orbit has different advantages as compared with the previous orbits described above, as defined by a new term which we call apogee pointing toward the sun bias factor. The apogee pointing towards the sun "APTS" bias factor is the ratio of the time spent in the sunlit hemispheres compared with the time spent in the dark hemisphere. This equals ta-b/Tb-a. With angle=0, the ABF is about 2.42. These orbits can be biased to latitude and time of day.

The present invention teaches a sun-synchronous satellite orbit having a line of apsides lying in or near (i.e., within 60 degrees) of the equatorial plane. The line of apsides is a straight line joining the apogee and perigee points of the orbit. Satellites with this characteristic will appear to "lean" within the orbital plane such that the apogee sub-point will appear at a much lower latitude than the roughly 60 degree latitudes of the Russian Molniya and early BOREALIS satellites. In fact, for an argument of perigee of either 0 degrees or 180 degrees, the apogee and perigee will both lie in the plane of the equator. This arrangement would be ideal for coverage of the tropical countries lying on or near the equator. However, other values for arguments of perigee could be selected so as to favor a particular latitude or latitude band.

For example, the world's most populous 10 degree band of latitude, between 20 degrees North and 30 degrees North, might be selected by having the apogee lie at 25ON. In addition to selecting the latitude band to be covered, a range of local time of day can also be selected for augmented coverage. This could be from 9:00 am to 6:00 pm, the hours in which the most telephone calls are made. A constellation based on this orbit can make most efficient use of ground stations.

Another positive factor of the present system is that satellites and launch vehicles may have reduced radiation effects as compared with earlier sun-synchronous elliptical orbits with more traditional arguments of perigee. It was found, for example, that the overall exposures to both radiation and orbital debris for the sun-synchronous orbits with apogees and perigees lying close to the equatorial plane, were actually less than for the more traditional elliptical sunsynchronous orbits with arguments of perigee closer to −270'.

Figure 3A:
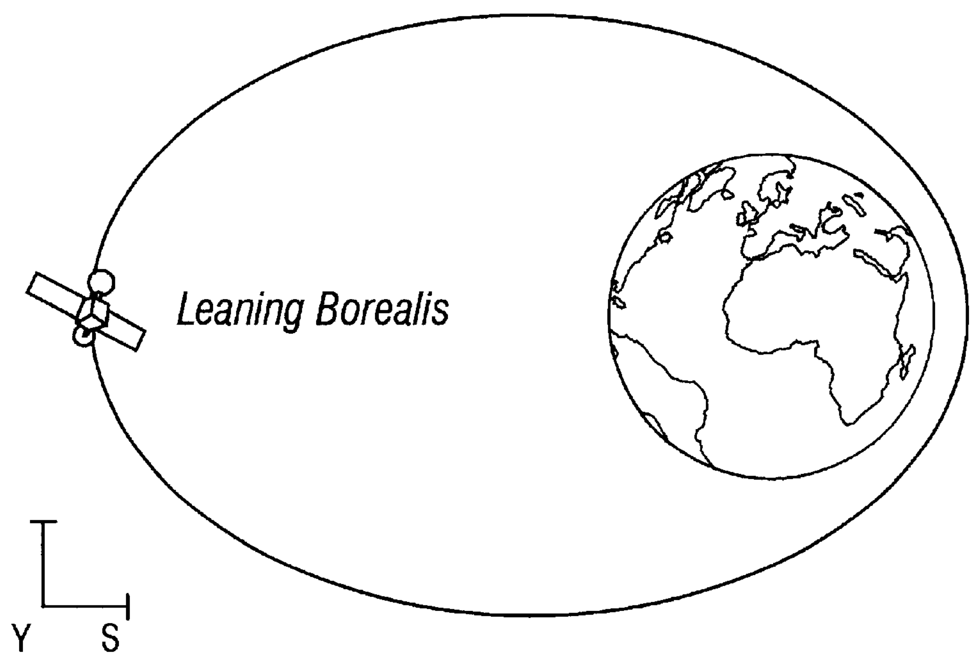
FIGS. 3A and 3B shows different views of the orbit.
Figure 3B:
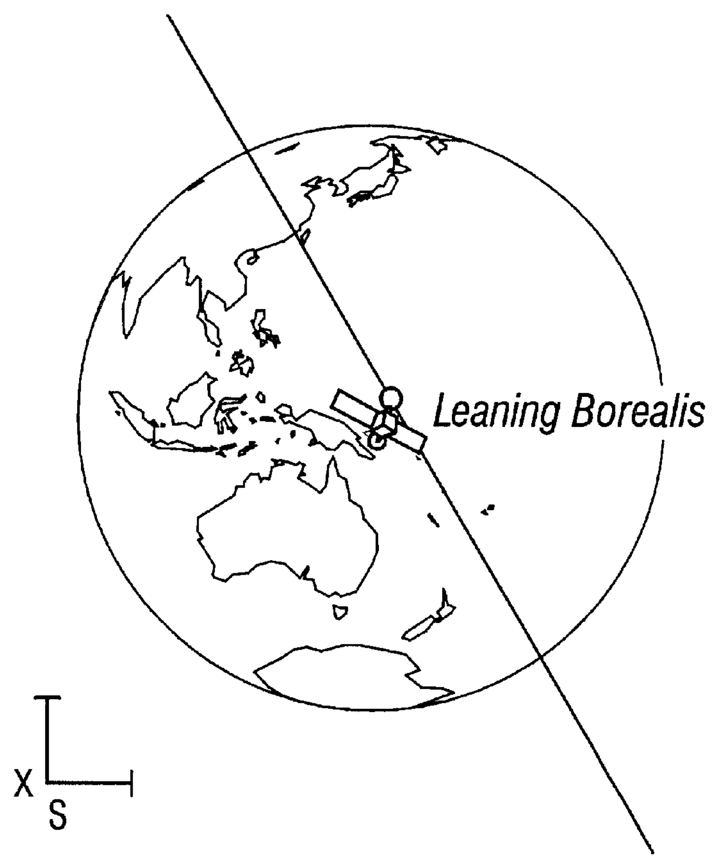

A typical example of the invention orbit is shown in FIGS. 3*a* and 3*b* which respectively show side and edge on views of the orbits. Orbital parameters for "lean angles" of 45 to 90 degrees (corresponding to arguments of perigee in ranges of 315 to 360 degrees and 180 to 225 degrees are summarized in Tables 1 and 2.

The most important earth coverage parameters for many satellite systems can be listed as follows:

Minimum number of satellites in view

Average number of satellites in view

The minimum elevation angle to the highest satellite

The average elevation angle to the highest satellite

Figure 4:
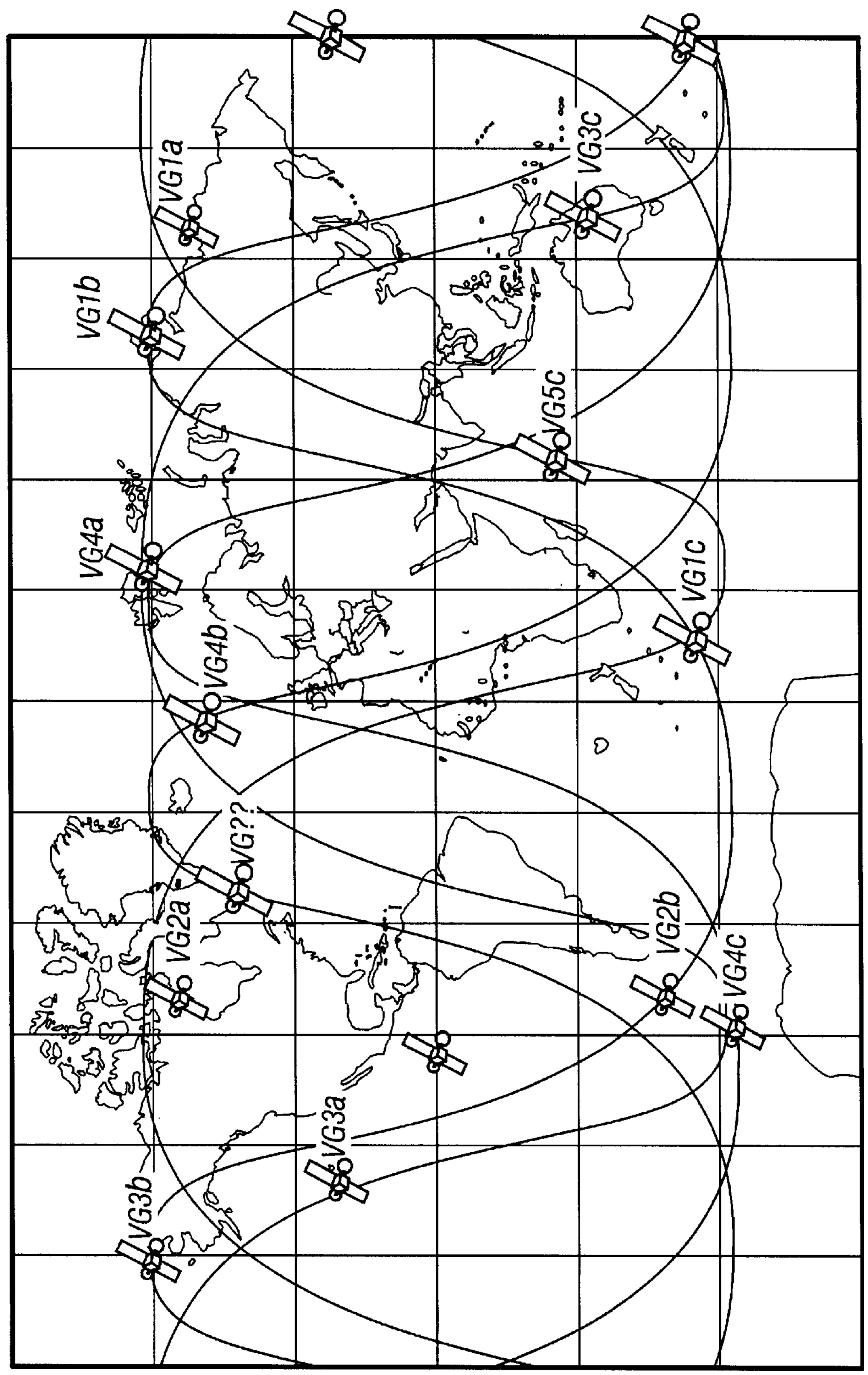
FIG. 4 shows a ground track view.

A significant plot for representing the earth coverage characteristics can be constructed that superficially resembles an equi-latitude or Mercator projection, as shown in FIG. 4. The latitude axis and values remain the same, but instead of degrees longitude along the abscissa, the axis is divided into 24 hours, with midnight represented by vertical lines on the left and right edges, and noon represented by a vertical line in the middle of the plot. This is ideal for representing coverage statistics (whatever they may be) for the sun-synchronous type orbit. Basically, the repeating track of the satellite always lies along the same line for different latitudes, since it occurs at the same local time (irrelevant of the longitude!).

The two dimensional orbital debris flux distribution relative to velocity is shown for two AOP's: NAN270 (Upright Borealis) and NAN180 (Apogee and perigee lying in the equatorial plane).

More characteristics of retrograde, sun-synchronous elliptic orbits with line of apsides lying in or near the equatorial plane are described herein. Coverage plots for the five-satellite ring of FIG. 4, showing the number of satellites in view and elevation angle data versus latitude and local time are presented. Stability of the orbit is discussed. Also analyzed is the effect of the trapped radiation field environment (Van Allen Belts) on these orbits, as well as the exposure to damage by natural and man-made debris. A major advantage seen for these orbits is that they can be used to provide augmented earth coverage for a selected latitudinal zone and a selected time of day (for all longitudes). This feature should prove useful for non-geostationary satellite communications systems where increased capacity is needed during daytime peak-traffic hours in heavily populated latitude bands.

This system uses two planes of elliptical, sun synchronous satellites having approximately three-hour periods. Each plane containing five satellites provide service mainly in the Northern Hemisphere (above approximately 25" North latitude). A third, eight-satellite equatorial for the entire Southern hemisphere and for the Northern hemisphere (up to about 25" North latitude). It is planned to place the initial ring of equatorial satellites in circular 4.8 hour orbits. The altitude of this ring (8050 km) ensures continuous day and night coverage out to 55" North and South latitudes, with a 5-degree mask angle.

The arguments of perigee for the two inclined (i=116.6') BOREALIS planes are 260' for the noon ascending node plane and 280" for the midnight ascending node plane. (Originally, both planes had arguments of perigee of 270") The two current BOREALIS planes have been found to provide extremely good coverage (elevation angles and satellites in view) for high latitude users'. Any BOREALIS type orbits with other than 270" arguments of perigee are referred to as "Leaning BOREALIS" orbits.

Day-night bias is a general term used by the authors to emphasize the increased amount or quality of daytime earth coverage as opposed to night-time coverage. The BOREALIS orbits (with the above arguments of perigee) are continuously tilted 10" towards the sun, and thus provide a moderate increase in day-night bias for high latitude Northern Hemisphere BOREALIS users.

As the number of CONCORDIA users in lower latitudes and in the Southern Hemisphere increases to a certain level, the daytime CONCORDIA coverage will become saturated first. At that time, it would be desirable to augment the circular orbit equatorial ring with an array having a positive day-night bias, to meet capacity demands of the market.

One method of achieving a day-night bias in both Southern and Northern Hemispheres is through the use of Apogee-Pointing-To-the-Sun (APTS) equatorial orbits. It was found that the use of a single ring of APTS satellites alone left some gaps in nighttime coverage, especially at the extreme Southern latitudes. This approach was rejected for initial deployment of CONCORDIA in favor of a ring of circular orbit satellites.

A second approach was to retain the initial ring of circular orbit CONCORDIAs, but augment it with an additional ring of APTS satellites. In the first attempt at constructing such a hybrid system, the APTS satellites were placed in orbit with little or no regard given to coordinating their motion with the circular CONCORDIA satellites. It was quickly seen that coverage on the more critical daytime side was uneven, with frequent line-ups of an elliptical with a circular satellite on the same meridian. Finally, a time synchronized pattern was developed to optimize the daytime coverage. It ensures that the satellites are approximately equally spaced and act like the teeth in a gear, on the sunlit hemisphere. This coordinated combination of circular and elliptical orbits 4 has been named the ELLIPSO "Gear" array (Patents Pending). This Gear array provides a significant augmentation in the daytime hours. However, since all of the Gear array satellites (both circular and elliptical) are in the equatorial plane, their coverage remains symmetrical about the equator, albeit varying with respect to time of day. That is, a positive day-night bias is ensured.

A third method of obtaining day-night bias in the geographic region from 20" N latitude through 60' South latitude, is to use one or more planes of satellites placed in the orbits described in this paper. This method could be used either as a stand-alone solution for designing entire constellations, or in conjunction with a baseline ring of circular equatorial satellites. The latter approach is preferred since it generally requires fewer satellites to obtain a positive day-night bias while maintaining coverage continuity during night-time.

The nominal Keplerian orbital Elements for the Leaning Borealis constellation(s)have been chosen to achieve improved coverage capacity for selected times of day at particular latitudes, taking advantage of the natural gravitational perturbations on satellite motion. In order to improve the overall orbital specification for this class of constellations, Central Body Point Mass with Zonal perturbations (52 through JSO), and Third Body Point Mass perturbations are included in their synthesis.

The Leaning Borealis satellites are place in elliptical, sun-synchronous orbits. They each have a 113 revolution/14 days repeat ground track. Sun-synchronicity means that the Right Ascension of the Ascending Node (RAAN) relative to the fictitious Sun is (approximately) Constant, and Satellite coverage will favor a particular local time of day. By specifying Arguments of Perigee (AOP), coverage will be focused at particular latitudes. In this paper, we will consider only the Node at Noon (NAN) and the Node at Midnight (NAM) orientations of the orbital planes. These place the orbital planes "edge on" to the sun. Other orientations are also possible, and have been considered previously 5.

The Leaning Borealis orbital constraints are expressed mathematically by $$\dot{\Omega}_N(t)=\dot{\Omega}_S=0.98565\ \ldots\ \text{deg/day} \Rightarrow \text{SunSync}$$

$$\dot{\omega}_N(t)=0$$

$$\omega_e-\dot{\Omega}_N(t)=\frac{14}{113}\left(\dot{M}_N(t)-\dot{\omega}_N(t)\right)\Rightarrow \dot{M}_N(t)=\frac{113}{14}\left(\omega_e-\dot{\Omega}_N(t)\right)$$

where R,(t) is the nominal Right Ascension of the Ascending Node (RAAN), UN(f)is the nominal argument of perigee, M,(t)1s' the nominal Mean Anomaly, and O, is the Earth rotation rate. (Note that the nominal Mean Anomaly rate uses the fact that the nominal perigee rate is zero.) It follows that the nominal values for the RAAN, Argument of Perigee, and Mean Anomaly which characterize Leaning Borealis configuration, are determined analytically, given their initial conditions, by Eq. (2), below, $$\Omega_N(t)=\Omega_0+\Delta(t)\dot{\Omega}_N(t)$$

$$\omega_N(t)=\omega_0+\Delta(t)\dot{\omega}_N(t)=\omega_0$$

$$M(t)=M_0+\Delta(t)\dot{M}_N(t)$$

where R,, , CO, , and M, are the initial values at epoch. Choosing an initial epoch at the Vernal Equinox, Mar. 21, 1999, 1 h 48 m OOs, the initial RAAN values are fl, =0 deg for the Borealis NAN plane, and Sz, =180 deg for Borealis NAM plane. For all configurations considered, the initial mean anomaly at the Vernal Equinox epoch is set to zero.

The remaining Keplerian elements (a, e, I) are chosen to maintain the constraints given equivalently by Eq. (I), instantaneously, and Eq. (2), globally, over time. Instantaneous solutions to Eq. (1) are constant in the presence only of Zonal perturbations. Introduction of the Third-Body point mass perturbations causes the solutions for (a, e, I) to become time dependent. Synthesis of nominal orbital elements for the Leaning Borealis constellations must consider this time-dependence. The following method was used to create a time varying history for the (a, e, I) triplet, in such a way that the constraints defined by Eq. (2) are maintained smoothly.

At the initial Epoch (i.e. the Vernal Equinox of 1999), choose values for (a, e, I) such that the cost functional, C(t), given by Eq. (3) is minimized.

$$C(t)=\sum_t \alpha[\Omega(t)-\Omega_N(t)]+\beta[\omega(t)-\omega_N(t)]+\gamma[M(t)-M_N(t)]$$

In this analysis C(t) is sampled over fourteen (14) days. The variables not subscripted are the actual values obtained by propagation in the presence of the selected perturbations (central-body, zonal, and thirdbody point-mass gravitational effects.) The coefficients a, p, and, y are chosen to normalize the individual error contributions to c(t). The coefficient triplet used for this study was chosen to be: (a, P, r)=(1 OOOJ 000, l). The orbital selection process is repeated each fourteen-(14) days through the nominal constellation lifetime (five (5) years for this study.) In the inductive step, the initial values for R, o, and, M at the new epoch are given by the propagated values at the end of the previous fourteen (14) days.

The composition of the space radiation environment is a function of mission altitude, inclination and duration, as well as variations in solar activity, and conditions of the magnetosphere il. Radiation transport to system electronics depends on composition, thickness, and geometry of spacecraft shielding as well as packaging of electronic subsystems". The effects of radiation on system electronics are influenced by technology selection, system design, and operating conditions (temperature, and electrical bias)". The radiation environment for a Low Earth Orbit (LEO) mission is dominated by protons and electrons trapped in the Van Allen Belts of the magnetosphere. The proton belts extend from roughly 600 to 9000 km, with a peak in proton flux at roughly 3300 km. The electron belts peak at around 5600 km and extend beyond geosynchronous orbits (36,000 km). A severe asymmetry is observed over the South Atlantic off the coast of Brazil, where the magnetosphere dips towards earth. In this region, referred to as the South Atlantic Anomaly, (SAA) the proton flux can be IO4 higher than regions outside the SAA. The trapped particle flux falls off sharply in the Polar Regions (abovef 60') where the Van Allen belts areabsent.14 Within the proton belts, the magnetosphere shields against heavy ions (HI) derived from Galactic cosmic rays (GCR) and moderates added particle flux due to solar flares. GCR HI flux is more significant at inclinations and altitudes outside the proton belts.

The GCR HI and trapped particle environments are modulated by the 1 I-year solar cycle. At solar minimum, the Van Allen belts become compressed and trapped proton flux is at a maximum, while at solar maximum the Van Allen belts expand causing trapped proton flux to decline. Besides this cyclical activity, there is a continuous stream of solar protons, and occasional solar flares, that modulate the trapped radiation spectra. Solar flares vary tremendously in intensity and frequency. Very large flares occur roughly once or twice during each solar cycle, and are quite random. Solar flares can result in brief periods of HI flux several orders of magnitude above nominal conditions due to GCR.

The effects of radiation on space systems has historically been of concern primarily in electronic semiconductor devices where the device operating parameters are tightly coupled to the quality (purity) of the crystal structure and precisely controlled dopant (impurity) concentrations and profiles throughout the device. A high fluence of energetic protons or neutrons can cause displacement damage that degrade crystal structure and free carrier density/ distribution, leading to changes in critical device electrical properties (carrier lifetime, bulk resistivity, junction leakage currents and transistor gain)." Silicon bipolar technologies can show degradation in electrical parameters at cumulative neutron/proton fluences as low as $10^{12}/cm^2$ (1 MeV equivalence in Si). The efficiency of solar cell arrays and opto-electronic devices can be significantly degraded at cumulative neutron/proton fluences as low as $10^{10}/cm^2$. Ionizing total dose, can lead to charge trapping in oxides and interface state formation at Silicon/oxide interfaces. This leads to shifts in device operating parameters. The rate at which the ionizing total dose accumulates within the device (dose rate) may impact observed performance degradation due to the relative annealing of trapped oxide charge and accumulation of interface states over time. Recent studies show that some technologies are sensitive to low dose rate enhancement of total dose effects in space, such that degradation and failure occurs at a lower total dose than observed when exposed at higher dose-rates.

For similar reasons to those discussed above, orbital debris issues may also be minimized by this system.

What is claimed is:

1. An array of satellites, comprising:

an array of satellites in orbit around the earth, each of said satellites including communication equipment thereon, said communications equipment on each of said satellites communicating with corresponding communications equipment on the earth, said array including a plurality of satellites, each of said satellites being in an elliptical orbit with a common ground track to other satellites, said satellites being sun synchronous relative to the earth and wherein said elliptical orbit is tilted to have an axis that is oriented within 60 degrees of equatorial axis, and said elliptical orbit is arranged such that the earth is at one focus of the ellipse, and a lowest part of the orbit passes between two portions of the Van Allen radiation belt, and a highest portion of the ellipse passes between two portions of the Van Allen radiation belt, wherein said lowest part of said orbit is between 1400 kilometers and 9500 kilometers, and the highest part of said orbit is between 11,000 kilometers and 25,000 kilometers.

2. An array of satellites as in claim 1, wherein said orbits are within 0–15 degrees of the equatorial plane.

3. An array of satellites as in claim 1, wherein said orbit has parameters which are optimized to exploit an asymmetry in the Van Allen radiation belts.

4. A method of communicating with the earth, comprising:

determining positions of the Van Allen radiation belts; including asymmetry in said belts;

determining an ellipse which passes between portions of main concentration of said Van Allen Belts both at its highest point and at its lowest point; and tilting the ellipse by an amount based on the asymmetry in a way that minimizes interaction of said ellipse with said Van Allen belts; and causing a plurality of satellites to orbit in said ellipse, and to communicate with communication equipment on the earth wherein said lowest part of said orbit is between 1400 kilometers and 9500 kilometers, and the highest part of said orbit is between 11,000 kilometers and 25,000 kilometers.

5. A method as in claim 4 wherein said orbits are within 0–15 degrees of the equatorial plane.

6. A method as in claim 4, wherein said orbit has parameters which are optimized to exploit an asymmetry in the Van Allen radiation belts.

7. An array of satellites, comprising:

an array of satellites in orbit around the earth, each of said satellites including communication equipment thereon, said communications equipment on each of said satellites communicating with corresponding communications equipment on the earth, said array including a plurality of satellites, each of said satellites being in an elliptical orbit with a common ground track to other satellites, said satellites being sun synchronous relative to the earth;

and wherein said elliptical orbit is tilted to have an axis that is oriented within 15 degrees of equatorial axis at an angle that minimizes interaction with the Van Allen radiation belt, and said elliptical orbit is arranged such that the earth is at one focus of the ellipse, and a lowest part of the orbit passes between two portions of the Van Allen radiation belt, and a highest portion of the ellipse passes between two portions of the Van Allen radiation belt wherein said lowest part of said orbit is between 1400 kilometers and 9500 kilometers, and the highest part of said orbit is between 11,000 kilometers and 25,000 kilometers.

* * * * *